(12) United States Patent
Kim

(10) Patent No.: US 12,403,883 B2
(45) Date of Patent: Sep. 2, 2025

(54) CALIBRATION METHOD FOR FRICTION PAD AND ELECTRO-MECHANICAL BRAKE APPARATUS USING THE SAME

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 51 days.

(21) Appl. No.: 18/429,043

(22) Filed: Jan. 31, 2024

(65) Prior Publication Data

US 2025/0065858 A1 Feb. 27, 2025

(30) Foreign Application Priority Data

Aug. 22, 2023 (KR) .................. 10-2023-0109578

(51) Int. Cl.
| | |
|---|---|
| *B60T 8/171* | (2006.01) |
| *B60T 8/172* | (2006.01) |
| *B60T 8/32* | (2006.01) |
| *B60T 13/74* | (2006.01) |
| *B60T 17/22* | (2006.01) |

(52) U.S. Cl.
CPC ............ *B60T 17/221* (2013.01); *B60T 8/172* (2013.01); *B60T 8/3205* (2013.01); *B60T 13/746* (2013.01); *B60T 13/748* (2013.01)

(58) Field of Classification Search
CPC ........ B60T 8/171; B60T 8/172; B60T 8/3205; B60T 13/74; B60T 13/741; B60T 13/746; B60T 13/748; B60T 17/22; B60T 17/221

USPC ............................................... 73/129; 701/70
See application file for complete search history.

(56) References Cited

U.S. PATENT DOCUMENTS

| | | | |
|---|---|---|---|
| 8,370,039 B2* | 2/2013 | Bentner ................. | B60T 7/107 701/70 |
| 2009/0043472 A1* | 2/2009 | Bentner ............... | B60T 17/221 701/70 |
| 2015/0217750 A1* | 8/2015 | Sussek ................. | B60T 13/741 701/70 |
| 2020/0307529 A1* | 10/2020 | Putz .................... | F16D 55/2255 |
| 2021/0354679 A1* | 11/2021 | Putz ..................... | B60T 17/221 |

* cited by examiner

*Primary Examiner* — Erick R Solis
(74) *Attorney, Agent, or Firm* — NovoTechIP International PLLC

(57) ABSTRACT

A method comprising: determining whether a state of the vehicle is a non-braking state and a non-accelerating state; in response to determining that a state of the vehicle is a braking state or an accelerating state, generating and transmitting, to the EMB, a calibration stop command; in response to determining that the state of the vehicle is the non-braking state and the non-accelerating state, determining whether it is necessary to calibrate the parameter; in response to (1) determining that it is necessary to calibrate the parameter or (2) receiving a calibration request signal from an EMB controller, generating and transmitting, to the EMB, a calibration start command; and in response to (1) determining that it is not necessary to calibrate the parameter and (2) not receiving the calibration request signal from the EMB controller, generating and transmitting, to the EMB, the calibration stop command.

10 Claims, 6 Drawing Sheets

CALIBRATION METHOD FOR FRICTION PAD AND ELECTRO-MECHANICAL BRAKE APPARATUS USING THE SAME

CROSS-REFERENCE TO RELATED APPLICATIONS

The present application claims priority to and the benefit of Korean Patent Application No. 10-2023-0109578, filed on Aug. 22, 2023, the entire disclosure of which is incorporated herein by reference.

TECHNICAL FIELD

The present disclosure relates to a calibration method for a friction pad and an electro-mechanical brake apparatus using the same.

BACKGROUND

The content described in the present section simply provides background information for the present disclosure and does not constitute related art.

A vehicle brake apparatus is an apparatus that is used to decelerate or stop a vehicle or maintain a parked state. The vehicle brake apparatus uses a friction force to perform a braking operation. The vehicle brake apparatus is an important component that is directly related to the safety of occupants of the vehicle.

In order to improve the safety and performance of the vehicle brake apparatus, an electro-mechanical brake (EMB) apparatus may be used as the brake apparatus. The electro-mechanical brake apparatus is an apparatus that controls a braking force using an electrical signal instead of directly operating a brake caliper when a driver steps on a brake pedal. The electro-mechanical brake apparatus performs a braking function using an independent actuator for each wheel. The electro-mechanical brake apparatus can precisely control the braking force because an electronic control system intervenes in a brake operation and controls each wheel independently.

Meanwhile, a friction pad of the brake apparatus may wear out when vehicle braking is performed. Further, the friction pad may undergo thermal deformation due to a rise or fall in a temperature of the brake apparatus.

An electro-mechanical brake apparatus of the related art measures an actual clamping force using a force sensor and performs calibration due to wearing out or thermal deformation of a friction pad on the basis of the actual clamping force. However, the force sensor is expensive and occupies a lot of space inside the brake apparatus. Because an internal configuration of the force sensor is complex, the reliability of the actual clamping force to be measured is low and maintenance is difficult. Because of these disadvantages of the force sensor, a force sensor-less electro-mechanical brake apparatus has been devised.

The force sensor-less electro-mechanical brake apparatus performs calibration due to wearing out or thermal deformation of the friction pad when the electro-mechanical brake apparatus is initialized before start-up of the vehicle. However, since such a force sensor-less electro-mechanical brake apparatus performs the calibration only when the electro-mechanical brake apparatus is initialized, the electro-mechanical brake apparatus cannot perform the calibration for a case in which long-distance and long-time driving should be performed. That is, the electro-mechanical brake apparatus cannot perform the calibration due to wearing out or thermal deformation of the friction pad during driving of the vehicle.

In order to perform the calibration due to the wearing out or thermal deformation of the friction pad during driving of the vehicle, a motor of the electro-mechanical brake apparatus should perform pressing/reducing of the pressing to collect information such as an actual stroke of a piston and an actual motor current. However, when the vehicle is moving, it is difficult to generate a braking force that are different from a driver's intentions, and even if the driver does generate braking forces that are different from the driver's intentions, it can result in driver perceived driving heterogeneity.

SUMMARY

In view of the above, the present disclosure is intended to solve these problems, and a main object of the present disclosure is to provide a calibration method for a parameter that changes due to wearing out or thermal deformation of a friction pad without using a force sensor even when a vehicle is driving, and an electro-mechanical brake apparatus.

Further, another main object of the present disclosure is to provide an electro-mechanical brake with high reliability of braking control and high braking stability.

The problems to be solved by the present disclosure are not limited to the problems mentioned above, and other problems not mentioned can be clearly understood by those skilled in the art from the description below.

An embodiment of the present disclosure provides a method of calibrating for a parameter variably changed according to wearing out or thermal deformation of a friction pad mounted on an electro-mechanical brake (EMB) of a vehicle, during driving, using a main controller, the method comprising: determining whether a state of the vehicle is a non-braking state and a non-accelerating state; in response to determining that a state of the vehicle is a braking state or an accelerating state, generating and transmitting, to the EMB, a calibration stop command instructing to stop calibrating the parameter; in response to determining that the state of the vehicle is the non-braking state and the non-accelerating state, determining whether it is necessary to calibrate the parameter; in response to (1) determining that it is necessary to calibrate the parameter or (2) receiving a calibration request signal from an EMB controller, generating and transmitting, to the EMB, a calibration start command instructing to start calibrating the parameter; and in response to (1) determining that it is not necessary to calibrate the parameter and (2) not receiving the calibration request signal from the EMB controller, generating and transmitting, to the EMB, the calibration stop command instructing to stop calibrating the parameter.

Another embodiment of the present disclosure provides a method of calibrating for a parameter variably changed according to wearing out or thermal deformation of a friction pad mounted on an electro-mechanical brake (EMB) of a vehicle, during driving, using a main controller, the method comprising: determining whether it is necessary to calibrate the parameter; in response to (1) determining that it is necessary to calibrate the parameter or (2) receiving, from an EMB controller, a calibration request signal, determining whether a state of the vehicle is a non-braking state and a non-accelerating state; and in response to determining that the state of the vehicle is the non-braking state and the non-accelerating state, generating and transmitting, to the EMB, a calibration start command instructing to start calibrating the parameter, wherein the main controller, when the EMB receives a braking signal or an acceleration signal for the vehicle while the EMB is calibrating the parameter in response to receiving the calibration start command, generates a calibration stop command and transmits the calibration stop command to the EMB.

Another embodiment of the present disclosure provides an apparatus for calibrating a parameter variably changed according to wearing out or thermal deformation of a friction pad while a vehicle is driving, the apparatus comprising: an electro-mechanical brake (EMB) configured to brake the vehicle; and a main controller configured to: generate (1) a calibration start command instructing the EMB to start calibrating the parameter or (2) a calibration stop command instructing the EMB to stop calibrating the parameter; and transmit the calibration start command and the calibration stop command to the EMB, wherein the calibration start command includes: a torque blending command instructing to (1) reduce a regenerative braking force of the EMB and (2) generate a friction braking force corresponding to the reduced regenerative braking force; a contact point measurement command instructing to measure a contact point using a motor rotation angle sensor and a current sensor; and an error correction command instructing to compare a first contact point previously stored and a second contact point measured after the first contact point was measured and to remove an error between the first and second contact points, and wherein the calibration stop command includes: a first stop command instructing to stop calibrating the parameter when the EMB is calibrating the parameter in response to receiving the calibration start command from the main controller; and a second stop command instructing to continue to stop calibrating the parameter when the EMB is not calibrating the parameter in response to not receiving the calibration start command from the main controller.

As described above, according to the present embodiment, there is an effect that it is possible to provide a calibration method for a parameter that changes due to wearing out or thermal deformation of a friction pad without using a force sensor even when a vehicle is driving, and an electro-mechanical brake apparatus.

Further, according to the present embodiment, there is an effect that it is possible to provide an electro-mechanical brake with high reliability of braking control and high braking stability.

DETAILED DESCRIPTION

Figure 1:
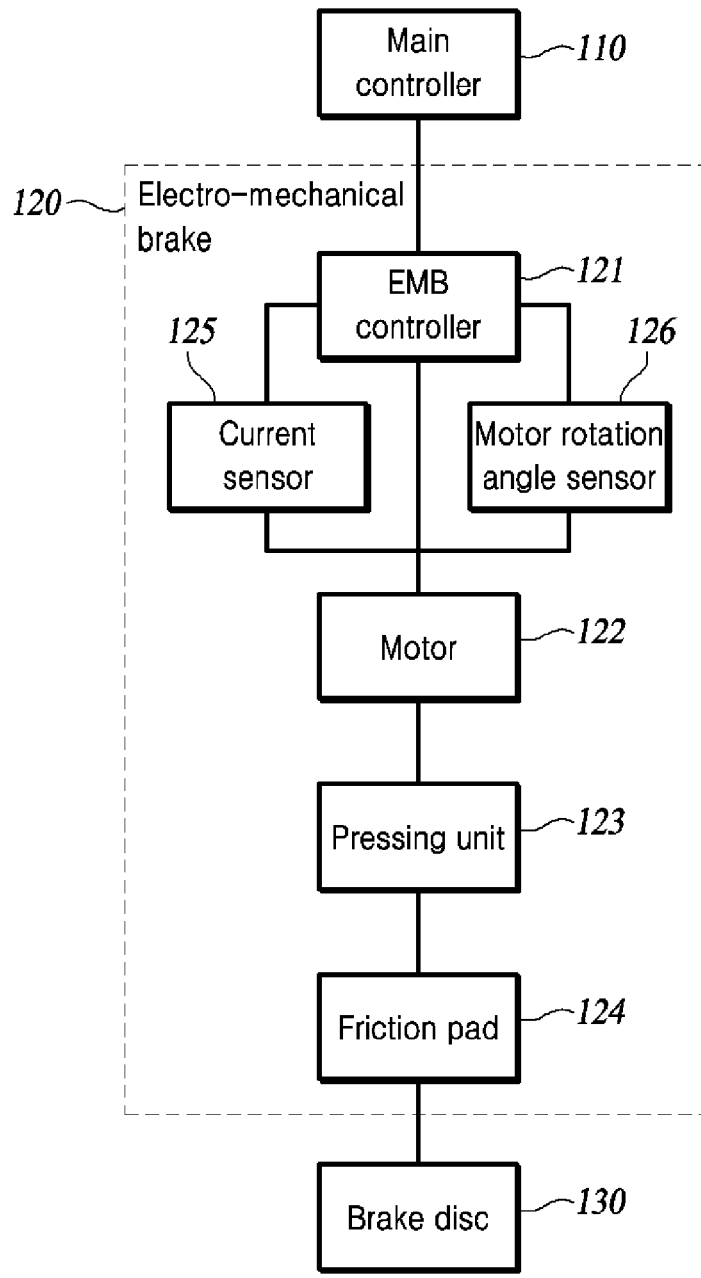
FIG. 1 is a block diagram of an electro-mechanical brake apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

Throughout the present specification, when a part 'includes' or 'comprises' a component, the part is meant to further include other components, not to exclude thereof unless specifically stated to the contrary.

The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention and is not intended to represent the only embodiments in which the present invention may be practiced. Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

Throughout the present specification, when a part 'includes' or 'comprises' a component, the part is meant to further include other components, not to exclude thereof unless specifically stated to the contrary.

The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention and is not intended to represent the only embodiments in which the present invention may be practiced.

FIG. 1 is a block diagram of an electro-mechanical brake apparatus according to an embodiment of the present disclosure.

Referring to FIG. 1, an electro-mechanical brake apparatus 100 according to an embodiment of the present disclosure includes all or some of a main controller 110, an electro-mechanical brake (EMB) 120, and a brake disc 130.

The main controller 110 may generate a demanded braking force required for braking of a vehicle. For example, the main controller 110 may receive a pedal stroke value from a pedal stroke sensor (not illustrated) mounted on the vehicle and generate a demanded braking force corresponding to the pedal stroke value. On the other hand, the main controller 110 may generate the demanded braking force required to perform anti-lock braking system (ABS) control. The main controller 110 can calculate a target clamping force for each wheel to generate the demanded braking force of the vehicle. The main controller 110 may transmit the target clamping force for each wheel to the electro-mechanical brake 120 disposed on each wheel via an in-vehicle network (IVN).

The main controller 110 may be communicatively connected to the EMB controller 121. The main controller 110 may generate a command to perform a calibration method or transmit the command to the EMB controller 121 according to the present disclosure. For example, the main controller 110 may generate a calibration start command and a calibration stop command and transmit the command to the EMB controller 121. The calibration start command is a command to calibrate a parameter that changes due to wearing out or thermal deformation of the friction pad 124 during driving of the vehicle, and the calibration stop command is a command to stop the calibration start command. The parameter will be described below.

In the present disclosure, the main controller 110 may be described as having a different configuration from the EMB controller 121, but it should be noted that a role of the main controller 110 is performed by the EMB controller 121 for each wheel so that the main controller 110 and the EMB controller 121 may have the same configuration.

The electro-mechanical brake 120 may be mounted on each wheel and perform braking of each wheel. The electro-mechanical brake 120 can perform braking of the wheels by converting kinetic energy of the vehicle into thermal energy using the friction force.

The electro-mechanical brake 120 may include all or some of a motor 122, a pressing unit 123, a friction pad 124, a current sensor 125, a motor rotation angle sensor 126, a force sensor (not illustrated), and a controller 121.

The motor 122 may generate a rotational force and transfer the rotational force to the pressing unit 123. The motor 122 may be a direct current (DC) motor, an alternating current (AC) motor, an induction motor, a synchronous motor, a step motor, a servo motor, a brushless motor, a linear motor, a permanent magnet synchronous motor (PMSM), or the like.

The pressing unit 123 may include all or some of a gearbox (not illustrated), a screw (not illustrated), a nut (not illustrated), and a piston (not illustrated).

The gearbox may include a plurality of gears. The gearbox may amplify the rotational force by engaging and rotating the plurality of gears using the rotational force transferred from the motor 122. For example, the gearbox may include a first gear and a second gear. The second gear has a smaller diameter than the first gear. The second gear can directly receive the rotational force from the motor 122. The second gear engages with the first gear and rotates, thereby transferring the rotational force to the first gear. Since the first gear rotates with a higher rotational force compared to the second gear, the rotational force is amplified.

The screw may receive the amplified rotational force from the gearbox. The screw may convert the amplified rotational force into a linear motion to press the piston or reduce pressing of the piston. The nut is disposed with limited rotation.

The friction pads 124 may be disposed on both sides of the brake disc 130. When the piston is pressed, the friction pad 124 may press the brake disc 130 from both sides of the brake disc 130. When the pressing unit 123 presses the friction pad 124 against the brake disc 130, the friction pad 124 is compressed and a clamping force is generated. Here, a point at which the clamping force starts to be generated is a contact point. As the pressing unit 123 moves from the contact point to the brake disc 130, the friction pad 124 is compressed, and the clamping force increases according to a degree to which the friction pad 124 is compressed.

The current sensor 125 may be mounted on the electro-mechanical brake 120 and used to measure a current flowing through the motor 122. For example, the current sensor 125 can measure an actual motor current using a current sensor signal indicating a voltage difference between both terminals of a shunt resistor mounted in a motor driving circuit.

The motor rotation angle sensor 126 may be mounted on the electro-mechanical brake 120 to detect a motor rotation angle, convert the motor rotation angle into a voltage signal, and output a motor rotation angle sensor signal as an analog signal. For example, the motor rotation angle sensor 126 may output a sine signal and a cosine signal as an analog signal.

The force sensor may be mounted on the electro-mechanical brake 120 to detect an actual clamping force, convert the actual clamping force into a voltage signal, and output a force sensor signal as an analog signal. However, in a calibration method according to the present disclosure, since the calibration of the parameter due to the wearing out or thermal deformation of the friction pad 124 may be performed without using the force sensor, it should be noted that the force sensor may be excluded from the electro-mechanical brake apparatus 100 according to the present disclosure.

The EMB controller 121 may receive the target clamping force from the main controller 110 via the IVN. The EMB controller 121 can receive the current sensor signal, the motor rotation angle sensor signal, and the force sensor signal. The EMB controller 121 can receive the calibration start command and the calibration stop command from the main controller 110.

The EMB controller 121 may calculate the actual motor current using the current sensor signal, and calculate a motor angular speed and an actual stroke of the piston using the motor rotation angle sensor signal.

The EMB controller 121 may generate a clamping force feedback using the force sensor signal. Alternatively, when there is no force sensor, the EMB controller 121 may generate the clamping force feedback by detecting the contact point and a home position using the actual stroke and the actual motor current. Here, the home position means the actual stroke of the piston when the electro-mechanical brake 120 is not activated. As another example, the EMB controller 121 may generate the clamping force feedback by using an artificial intelligence (AI) engine. Here, the artificial intelligence engine may be trained to receive the current sensor signal and the motor rotation angle sensor signal and output the actual clamping force.

The EMB controller 121 may set a threshold value for the actual motor current by comparing the actual motor current with the actual stroke of the piston. That is, the EMB controller 121 may determine how much the actual stroke of the piston occurs depending on a current applied to the motor 122, and may determine that wearing out or the thermal deformation of the friction pad 124 has occurred when a higher current should be applied to the motor 122 in order to generate the actual stroke. When the actual motor current is calculated as a value equal to or smaller than the threshold value, the EMB controller 121 may generate a calibration request signal and transmit the calibration request signal to the main controller 110.

Figure 2:
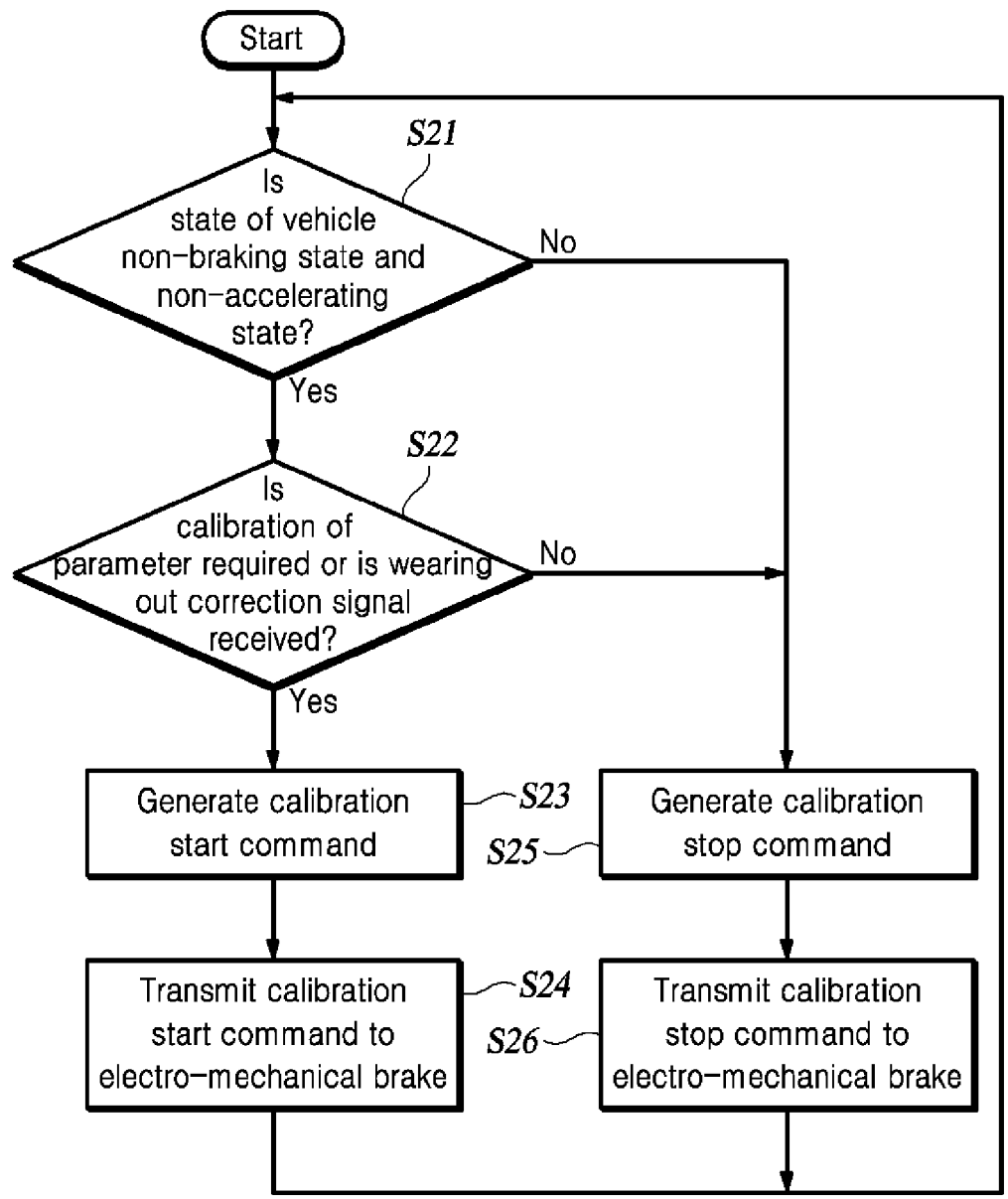
FIG. 2 is a flowchart illustrating a calibration method for a parameter that changes due to wearing out or thermal deformation of a friction pad according to an embodiment of the present disclosure.

FIG. 2 is a flowchart illustrating a calibration method for a parameter that changes due to wearing out or thermal deformation of the friction pad according to an embodiment of the present disclosure.

Figure 6:
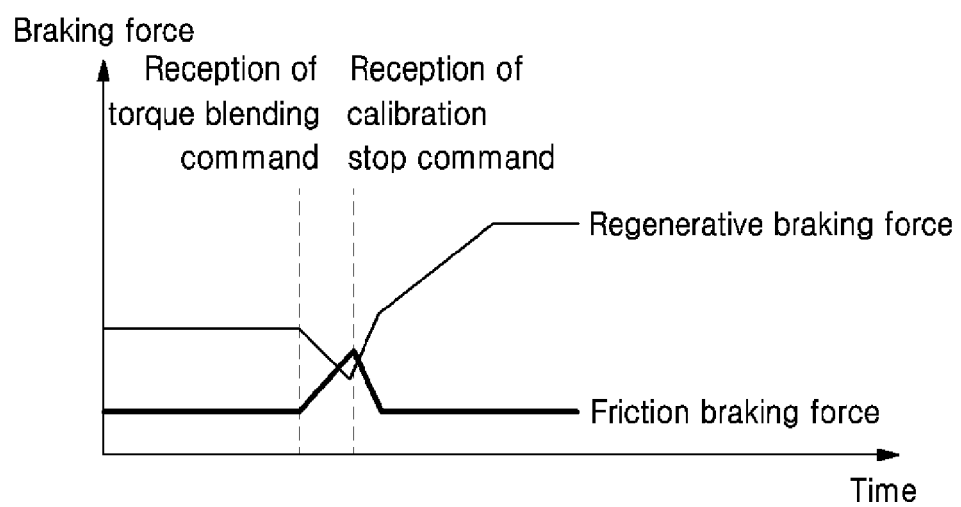
FIG. 6 is a graph showing a relationship between the regenerative braking force and the friction braking force when the electro-mechanical brake receives a calibration stop command while performing parameter calibration.

FIG. 6 is a graph showing a relationship between a regenerative braking force and a friction braking force when the electro-mechanical brake receives a calibration stop command while performing parameter calibration. Specifically, this is a graph showing a relationship between the regenerative braking force and the friction braking force when an acceleration signal for the vehicle is generated while the electro-mechanical brake is performing the parameter calibration.

The method of calibrating the parameter that changes due to the wearing out or thermal deformation of the friction pad 124 according to an embodiment of the present disclosure will be described with reference to FIGS. 2 and 6.

The main controller 110 may determine whether the state of the vehicle is the non-braking state (i.e., whether the vehicle is braking or not) and the non-accelerating state (i.e., whether the vehicle is accelerating or not) (S21). The non-braking state is a state in which a braking signal for the vehicle is not generated. In other words, the non-braking state is a state in which the demanded braking force is zero. The non-accelerating state refers to a state in which the acceleration signal for the vehicle is not generated.

When the main controller 110 determines that the state of the vehicle is the non-braking state and the non-accelerating state, the main controller 110 may determine whether the calibration of the parameter that changes due to the wearing out or thermal deformation of the friction pad 124 is required or required (S22). On the other hand, when the main controller 110 determines that the state of the vehicle is the braking state or the accelerating state, the main controller 110 generates a calibration stop command (S25) and transmits the calibration stop command to the electro-mechanical brake (S26).

The parameter that changes due to the wearing out or thermal deformation of the friction pad 124 may include a position value of the contact point. When the wearing out or thermal deformation of the friction pad 124 occurs, a position of the contact point may be different from that when the wearing out or thermal deformation of the friction pad 124 does not occur. When the braking of the vehicle is controlled using a previously measured position value of the contact point, a deviation may occur between a predicted braking distance and an actual braking distance and this may cause danger, and thus, the parameter calibration due to the wearing out or thermal deformation of the friction pad 124 is required. When the electro-mechanical brake 120 does not include a force sensor, the main controller 110 has no choice but to estimate the clamping force feedback using the position value of the contact point, as described above. When the wearing out or thermal deformation of the friction pad 124 occurs, the position of the contact point may change and a deviation between the clamping force feedback and the actual clamping force may increase, and thus, the parameter calibration due to the wearing out or thermal deformation of the friction pad 124 is required. In addition, when the parameter that changes due to the wearing out or thermal deformation of the friction pad 124 is not calibrated, various problems may occur in relation to braking control for the vehicle, and since these are problems known to those skilled in the art, detailed description of such problems may be omitted.

The main controller 110 may determine whether or not the parameter calibration is required on the basis of at least one of the number of times friction braking is performed, a temperature of the friction pad 124 when the friction braking is performed, and the braking force when the friction braking is performed. This is because an amount of wearing out or thermal deformation of the friction pad 124 is proportional to the number of times the friction braking is performed, the temperature of the friction pad when the friction braking is performed, and the braking force when the friction braking is performed. In an example in which the main controller 110 determines whether the parameter calibration is required, the main controller 110 determines whether or not the parameter calibration is required, on the basis of the number of times the friction braking is performed, and weights may be assigned to a temperature condition for the friction pad when the friction braking is performed, and a braking force condition when the friction braking is performed.

When the main controller 110 determines that the parameter calibration is required or receives the calibration request signal from the EMB controller 121, the main controller 110 may generate the calibration start command to calibrate the parameter (S23) and transmit the calibration start command to the electro-mechanical brake 120 (S24). On the other hand, when the main controller 110 does not determine that parameter calibration is required and does not receive the calibration request signal from the EMB controller 121, the main controller 110 may generate the calibration stop command (S25) and transmit the calibration stop command to the electro-mechanical brake 120 (S26).

The calibration start command may include a torque blending command, a contact point measurement command, an error correction command, and a return command.

The torque blending command is a command to reduce the regenerative braking force of the electro-mechanical brake 120 and generate a friction braking force corresponding to the reduced regenerative braking force. Regenerative braking that is performed from a vehicle such as a hybrid electric vehicle (HEV), an electric vehicle (EV), or a fuel cell electric vehicle (FCEV) is a braking scheme in which a driving motor is used as a generator to charge a battery when the vehicle is braked, and an additional braking force is generated. However, the regenerative braking in the present disclosure includes coast regenerative braking for generating a braking force for an internal combustion engine vehicle even when the vehicle is not braked. A coast regenerative braking force of about 0.1 g may be generated. The regenerative braking force to be generated may be greater than the coast regenerative braking force.

The contact point measurement command is a command to measure the contact point again using the motor rotation angle sensor 126 and the current sensor 125. Since a method of measuring the contact point is the same as that described above, description thereof will be omitted.

The error correction command is a command to correct the error between the previously stored contact point and the measured contact point by comparing the previously stored contact point with the measured contact point. The error between the previously stored contact point and the measured contact point can be corrected using a method such as renewing a preset contact point or renewing the home position.

The return command is a command to repeat a process of determining whether the state of the vehicle is the non-braking state and the non-accelerating state after the error is removed in response to the error correction command. That is, the return command is a command to repeat step S21 after the error is removed in response to the error correction command.

The calibration stop command may include a first stop command, a second stop command, and a return command.

The first stop command is a command to stop the parameter calibration when the electro-mechanical brake 120 receives the calibration start command from the main controller 110 and is performing the parameter calibration. When the electro-mechanical brake 120 receives the calibration stop command while receiving the calibration start command from the main controller 110 and performing torque blending, the electro-mechanical brake 120 may stop the torque blending.

The second stop command is a command to maintain a state in which the electro-mechanical brake 120 does not perform the parameter calibration, when the electro-mechanical brake 120 does not receive the calibration start command from the main controller 110 and does not perform the parameter calibration.

Since the return command is the same as the return command included in the calibration start command, description thereof is omitted.

Figure 3:
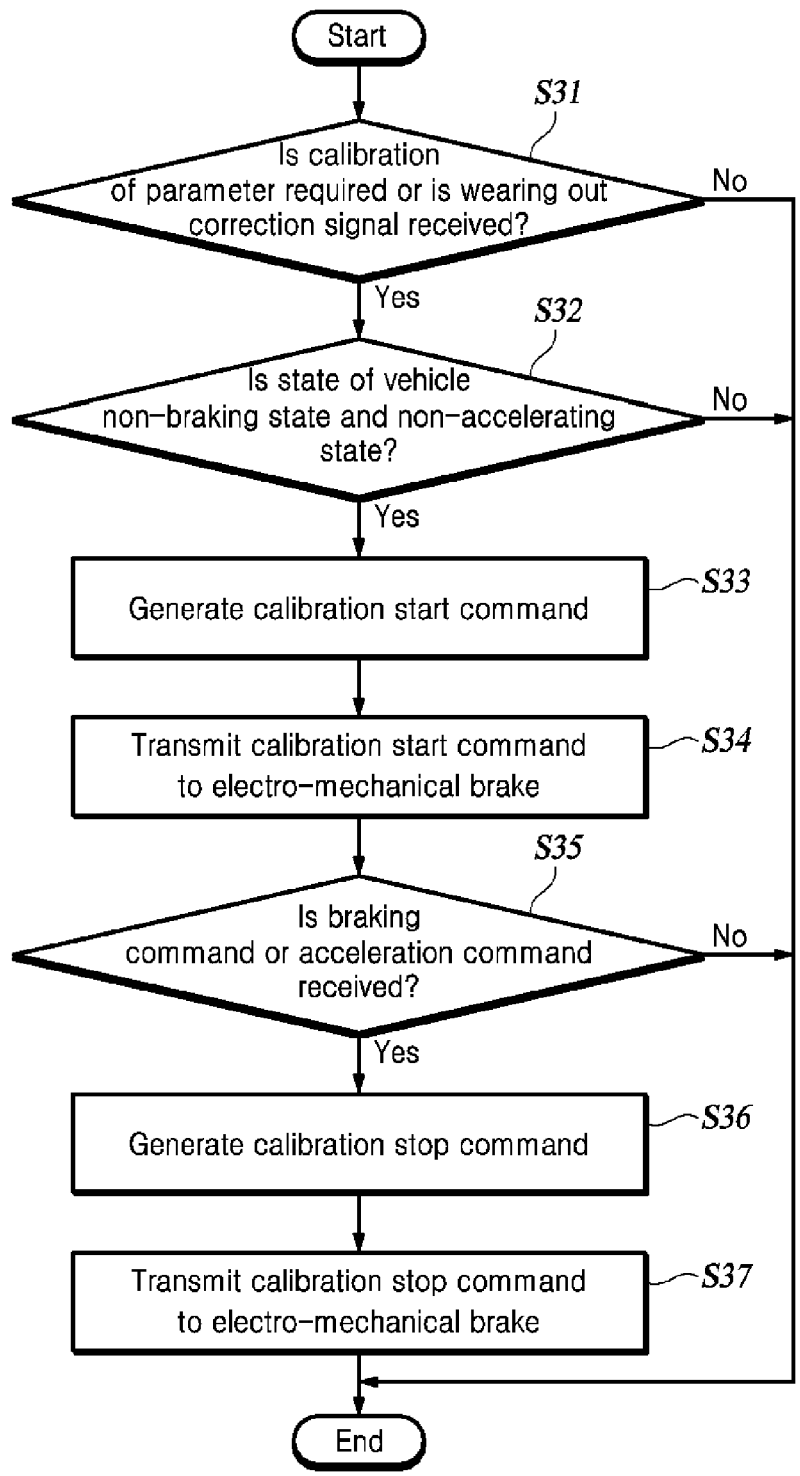
FIG. 3 is a flowchart illustrating a calibration method for a parameter that changes due to wearing out or thermal deformation of a friction pad according to another embodiment of the present disclosure.

FIG. 3 is a flowchart illustrating a method of calibrating the parameter that changes due to the wearing out or thermal deformation of the friction pad according to another embodiment of the present disclosure.

Referring to FIGS. 3 and 6, the method of calibrating the parameter that changes due to the wearing out or thermal deformation of the friction pad 124 according to another embodiment of the present disclosure will be described.

The main controller 110 may determine whether or not the parameter calibration is required (S31).

When the main controller 110 determines that parameter calibration is required or receives the calibration request signal from the EMB controller 121, the main controller 110 may determine whether the state of the vehicle is the non-braking state and the non-accelerating state (S32). On the other hand, when the main controller 110 does not determine that the parameter calibration is required and does not receive the calibration request signal from the EMB controller 121, the main controller 110 ends an algorithm.

When the main controller 110 determines that the state of the vehicle is the non-braking state and the non-accelerating state, the main controller 110 may generate the calibration start command (S33) and transmit the calibration start command to the electro-mechanical brake 120 (S34). On the other hand, when the main controller 110 determines that the state of the vehicle is the braking state or the accelerating state, the main controller 110 ends the algorithm.

When the main controller 110 receives the braking signal or the acceleration signal for the vehicle while the electro-mechanical brake 120 receives the calibration start command and performs the calibration of the parameter (S35), the main controller 110 may generate the calibration stop command (S36) and transmit the calibration stop command to the electro-mechanical brake 120 (S37).

Figure 4:
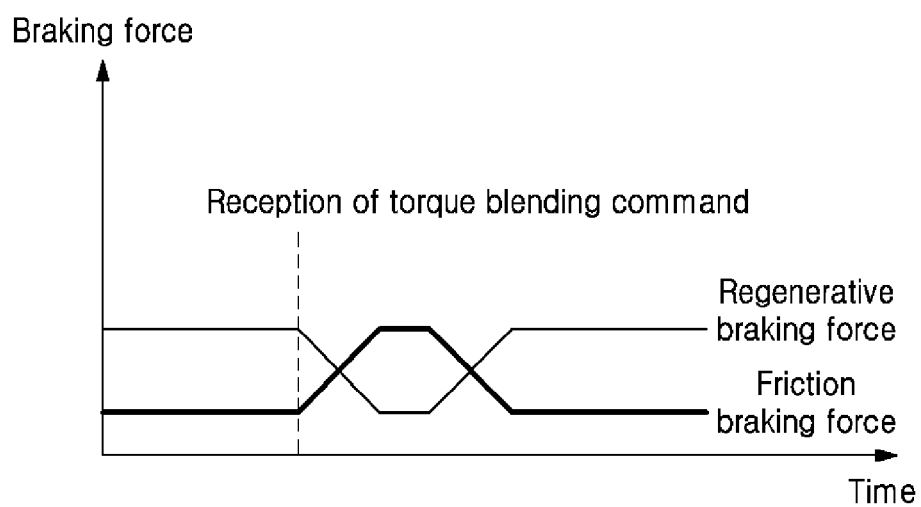
FIG. 4 is a graph showing a relationship between a regenerative braking force and a friction braking force when the electro-mechanical brake receives a torque blending command.

FIG. 4 is a graph showing a relationship between the regenerative braking force and the friction braking force when the electro-mechanical brake receives the torque blending command.

A reason that a friction correction method according to the present disclosure includes performing torque blending and effects obtained by performing the torque blending will be described with reference to FIG. 4.

The electro-mechanical brake 120 according to the present disclosure provides a method of performing the calibration of the parameter due to the wearing out or thermal deformation of the friction pad 124 during driving of the vehicle without relying on a force sensor. The electro-mechanical brake 120 that does not use the force sensor estimates the actual clamping force by using the current sensor 125 and the motor rotation angle sensor 126. An operating torque of the motor 122 is proportional to the actual motor current, but a signal of the current sensor 125 has a lot of noise. The signal of the current sensor 125 has different values depending on situations, such as pressing of the brake disc 130, reducing of the pressing of the brake disc 130, or force maintenance in the brake disc 130. Therefore, an actual motor current and an actual stroke value when a sufficient friction braking force is applied are required in order to estimate the actual clamping force by using the current sensor 125 and the motor rotation angle sensor 126.

The present disclosure is characterized by temporarily suspending regenerative braking and performing torque blending for generating a friction braking force for calibration of the parameter due to the wearing out or thermal deformation of the friction pad 124 in order to secure a sufficient braking force for calibration of the parameter that changes depending on the wearing out or thermal deformation of the friction pad 124 during driving of the vehicle.

The present disclosure is used to perform calibration of the parameter due to the wearing out or thermal deformation of the friction pad 124 during driving of the vehicle by switching the regenerative braking to friction braking instead of temporarily stopping the regenerative braking. As described above, it is necessary to generate a sufficient friction braking force and operate the motor 122 at a constant speed in order to accurately perform the calibration of the parameter due to the wearing out or thermal deformation of the friction pad 124. When the braking force changes frequently or a driving speed of the motor 122 changes, the precision of contact point estimation may be degraded. However, when the torque blending in which the regenerative braking is temporarily stopped and switching to the friction braking occurs is performed as in the calibration method provided in the present disclosure in a case in which the vehicle is in the non-braking state and the non-accelerating state, it is possible to generate a sufficient braking force and operate the motor 122 at a constant speed.

When the regenerative braking is temporarily stopped by performing the torque blending, this means that a battery is not charged for a period of time in which the regenerative braking is stopped. However, since the calibration method according to the present disclosure is not operated frequently and is operated for a short time, the calibration method does not affect fuel efficiency of the vehicle.

Figure 5:
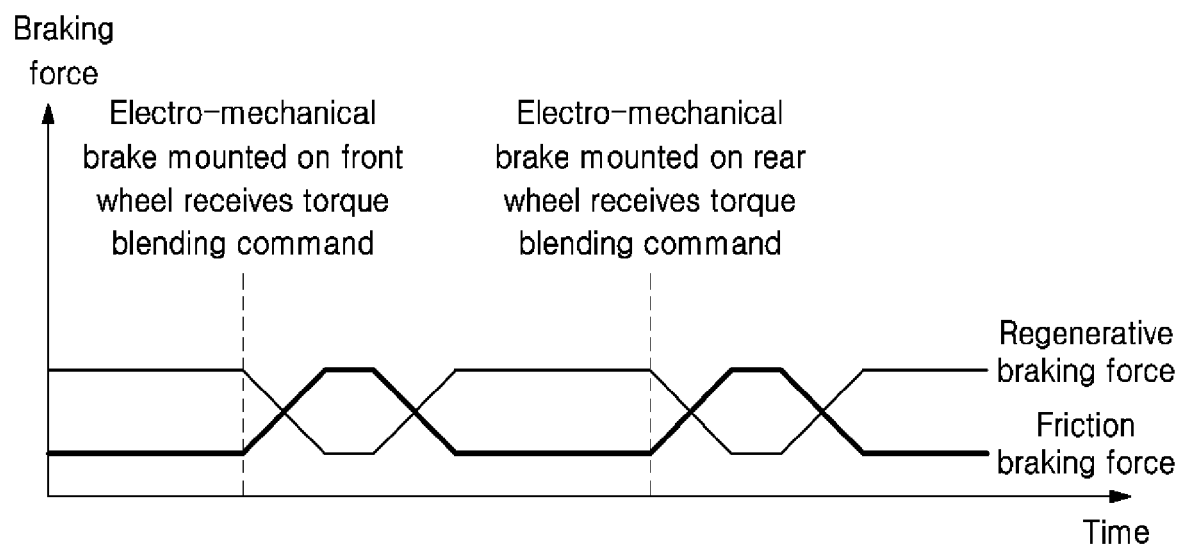
FIG. 5 is a graph showing a relationship between the regenerative braking force and the friction braking force when electro-mechanical brakes mounted on a front wheel and a rear wheel receive the torque blending command at a predetermined time interval.

FIG. 5 is a graph showing a relationship between the regenerative braking force and the friction braking force when electro-mechanical brakes mounted on a front wheel and a rear wheel receive the torque blending command at a predetermined time interval.

A reason for transmission of the torque blending command to the electro-mechanical brakes mounted on the front wheel and the rear wheel at the predetermined time interval, and effects of the transmission will be described with reference to FIG. 5.

The main controller 110 may transmit the calibration start command to the electro-mechanical brake mounted on the front wheel and the electro-mechanical brake mounted on the rear wheel at a predetermined time interval so that the electro-mechanical brake mounted on the front wheel and the electro-mechanical brake mounted on the rear wheel do not calibrate the parameter at the same time. That is, the main controller 110 can perform control so that the electro-mechanical brake mounted on the front wheel and the electro-mechanical brake mounted on the rear wheel do not perform the torque blending at the same time.

In some cases, even when regenerative braking force is low and the torque blending is performed to provide the friction braking force, a sufficient braking force may not be generated to calibrate the parameter that changes due to the wearing out or thermal deformation of the friction pad 124. For example, when a vehicle speed in the non-braking state and the non-accelerating state is significantly low, a small regenerative braking force may be generated. In the calibration method according to the present disclosure, to prepare for such a case, the torque blending is performed at different moments for the front wheel and the rear wheel. When the torque blending is separately performed between the front wheel and the rear wheel, a friction braking force corresponding to a low regenerative braking force is all converted to the friction braking force of the front wheel or the friction braking force of the rear wheel, thereby making it possible to generate sufficient braking force for calibrating the parameter that changes due to the wearing out or thermal deformation of the friction pad 124.

The flowchart of the present disclosure describes processes as being sequentially executed, but this is merely illustrative of the technical idea of an embodiment of the present disclosure. In other words, since it is apparent to those having ordinary skill in the art that an order described in the flowchart may be changed or one or more processes may be executed in parallel without departing from the essential characteristics of an embodiment of the present disclosure, the flowchart is not limited to a time-series order.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of calibrating for a parameter variably changed according to wearing out or thermal deformation of a friction pad mounted on an electro-mechanical brake (EMB) of a vehicle, during driving, using a main controller, the method comprising:
   determining whether a state of the vehicle is a non-braking state and a non-accelerating state;
   in response to determining that a state of the vehicle is a braking state or an accelerating state, generating and transmitting, to the EMB, a calibration stop command instructing to stop calibrating the parameter;
   in response to determining that the state of the vehicle is the non-braking state and the non-accelerating state, determining whether it is necessary to calibrate the parameter;
   in response to (1) determining that it is necessary to calibrate the parameter or (2) receiving a calibration request signal from an EMB controller, generating and transmitting, to the EMB, a calibration start command instructing to start calibrating the parameter; and
   in response to (1) determining that it is not necessary to calibrate the parameter and (2) not receiving the calibration request signal from the EMB controller, generating and transmitting, to the EMB, the calibration stop command instructing to stop calibrating the parameter.

2. The method of claim 1, wherein the calibration start command includes at least one of:
   a torque blending command instructing to reduce a regenerative braking force of the EMB and to generate a friction braking force corresponding to the reduced regenerative braking force;
   a contact point measurement command instructing to measure, using a motor rotation angle sensor and a current sensor, a contact point;
   an error correction command instructing to (1) compare a first contact point previously stored and a second contact point measured after the first contact point was measured and (2) remove an error between the first and second contact points; and a return command instructing to determine whether the state of the vehicle is the non-braking state and the non-accelerating state after removing the error.

3. The method of claim 1, wherein the calibration stop command includes at least one of:
a first stop command instructing to stop calibrating the parameter when the EMB is calibrating the parameter in response to receiving the calibration start command from the main controller;
a second stop command instructing to continue to stop calibrating the parameter calibration when the EMB is not calibrating the parameter in response to not receiving the calibration start command from the main controller; and
a return command instructing to determine whether the state of the vehicle is the non-braking state and the non-accelerating state.

4. The method of claim 1, wherein whether it is necessary to calibrate the parameter is determined based on at least one of:
a number of times friction braking has been performed;
a temperature of the friction pad when the friction braking is performed; and
a braking force when the friction braking is performed.

5. The method of claim 1, wherein, for generating the calibration request signal, the EMB controller performs:
calculating, using a current sensor and a motor rotation angle sensor, an actual motor current of a motor mounted on the EMB and an actual stroke of a piston mounted on the EMB;
comparing the actual motor current with the actual stroke of the piston to set a threshold value; and
generating the calibration request signal when the actual motor current is equal to or smaller than the threshold value.

6. The method of claim 1, wherein;
the EMB comprises (1) a first EMB mounted on a front wheel of the vehicle and (2) a second EMB mounted on a rear wheel of the vehicle, and
the calibration start command is transmitted to the first and second EMBs at a predetermined time interval so that the first and second EMBs do not calibrate the parameters at the same time.

7. A method of calibrating for a parameter variably changed according to wearing out or thermal deformation of a friction pad mounted on an electro-mechanical brake (EMB) of a vehicle, during driving, using a main controller, the method comprising:
determining whether it is necessary to calibrate the parameter;
in response to (1) determining that it is necessary to calibrate the parameter or (2) receiving, from an EMB controller, a calibration request signal, determining whether a state of the vehicle is a non-braking state and a non-accelerating state; and
in response to determining that the state of the vehicle is the non-braking state and the non-accelerating state, generating and transmitting, to the EMB, a calibration start command instructing to start calibrating the parameter,
wherein the main controller, when the EMB receives a braking signal or an acceleration signal for the vehicle while the EMB is calibrating the parameter in response to receiving the calibration start command, generates a calibration stop command and transmits the calibration stop command to the EMB.

8. The method of claim 7, wherein whether it is necessary to calibrate the parameter is determined based on at least one of:
a number of times friction braking has been performed;
a temperature of the friction pad when the friction braking is performed; and
a braking force when the friction braking is performed.

9. The method of claim 7, wherein, for generating the calibration request signal, the EMB controller performs:
measuring, using a current sensor and a motor rotation angle sensor, an actual motor current of a motor mounted on the EMB and an actual stroke of a piston mounted on the EMB;
comparing the actual motor current with the actual stroke of the piston to set a threshold value; and
generating the calibration request signal when the actual motor current is equal to or smaller than the threshold value.

10. An apparatus for calibrating a parameter variably changed according to wearing out or thermal deformation of a friction pad while a vehicle is driving, the apparatus comprising:
an electro-mechanical brake (EMB) configured to brake the vehicle; and
a main controller configured to:
generate (1) a calibration start command instructing the EMB to start calibrating the parameter or (2) a calibration stop command instructing the EMB to stop calibrating the parameter; and
transmit the calibration start command and the calibration stop command to the EMB,
wherein the calibration start command includes:
a torque blending command instructing to (1) reduce a regenerative braking force of the EMB and (2) generate a friction braking force corresponding to the reduced regenerative braking force;
a contact point measurement command instructing to measure a contact point using a motor rotation angle sensor and a current sensor; and
an error correction command instructing to compare a first contact point previously stored and a second contact point measured after the first contact point was measured and to remove an error between the first and second contact points, and wherein the calibration stop command includes:
a first stop command instructing to stop calibrating the parameter when the EMB is calibrating the parameter in response to receiving the calibration start command from the main controller; and
a second stop command instructing to continue to stop calibrating the parameter when the EMB is not calibrating the parameter in response to not receiving the calibration start command from the main controller.

* * * * *